Nov. 7, 1950          G. A. LYON          2,528,529
METHOD OF AND APPARATUS FOR FORMING PLASTIC
Filed Dec. 22, 1945
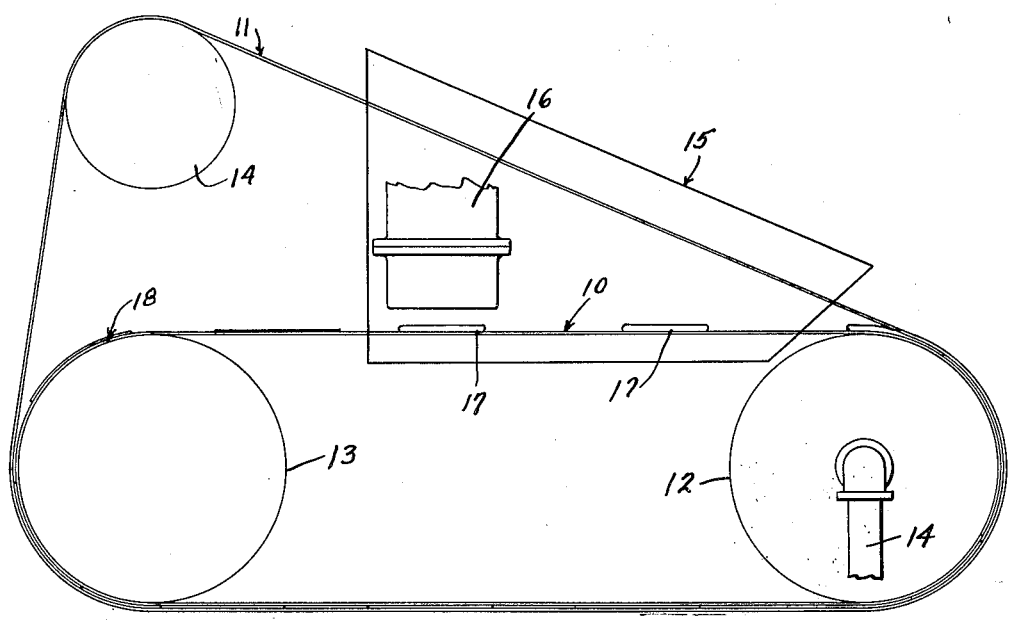
Inventor
GEORGE ALBERT LYON
by The Firm of Charles W. Hills Attys.

Patented Nov. 7, 1950

2,528,529

UNITED STATES PATENT OFFICE 2,528,529

METHOD OF AND APPARATUS FOR FORMING PLASTIC

George Albert Lyon, Allenhurst, N. J.

Application December 22, 1945, Serial No. 636,875

5 Claims. (Cl. 18—6)

1

This invention relates to the forming of plastic and more particularly to the forming of flat plastic articles such as sheet and the like.

An object of this invention is to provide an improved method of and apparatus for forming plastic articles, such as sheet, from a plastic mix.

Another object of this invention relates to the provision of a new way of forming plastic from plastic mix by the use of endless belts having polished surfaces.

Yet another object of this invention relates to the provision of a new method of and apparatus for forming sheets of plastic in a simple and economical manner.

In accordance with the general features of this invention, there is provided a plurality of cooperable belts having highly polished surfaces, a pressure means for forcing them into cooperation and means for delivering plastic mix between the belts prior to their being pressed together whereby the mix may be formed into continuous plastic sheets.

Another feature resides in the provision of an improved method of forming plastic wherein converging metal belts, one of which has an upwardly facing supporting surface, are preheated, a succession of thermoplastic masses of material are deposited upon the upwardly facing surface of said one belt, the belts are driven in unison toward convergence and run about a common pair of spaced drums to maintain the belts close together for squeezing the masses of material flat therebetween, and the belts cooled and separated to release the flattened plastic blanks.

Other objects, features and advantages of this invention will more fully appear from the following detailed description taken in connection with the accompanying drawings in which:

The figure is a diagrammatic view of one way of forming plastic sheets in accordance with this invention.

As shown on the drawing:

Now referring to the figure it will be perceived that the reference characters 10 and 11 designate generally two endless belts which may be of any suitable width and length depending upon the character of the plastic articles being fabricated. The belt 11, however, is made substantially longer than the belt 10 for reasons that will become more apparent hereinafter.

These belts may be made from any suitable sheet material although I contemplate excellent results may be obtained by making them

2 of stainless steel or other metal sheets having at least one highly polished surface. It should also be noted that the polished surfaces of these two belts 10 and 11 are so located on the belts as to come into engagement when the belts converge in the manner to be now described.

The endless belt 10 is mounted on a pair of spaced cylindrical metal drums 12 and 13, one or both of which may be positively driven. Any suitable mechanism such as is used in the endless conveyor art, may be employed for the purpose of driving one of these drums, although I preferably drive only the drum 12.

In view of the fact that my novel plastic forming method and apparatus is especially adapted for the handling of synthetic thermoplastic material, it is necessary that heat be employed in the flattening of the plastic, and to this end I propose to suitably heat at least one of the drums, namely, the drum 12. This may be effected by a steam connection such as the connection 14 shown in the drawing. However, it is of course clear that any other heating medium may be employed for this purpose.

The temperature of the heating medium will of course vary with the type of plastic involved. In other words, the melting point of the particular plastic must be taken into consideration and heat must be supplied in relation thereto.

The endless belt 11 is supported upon a cylindrical metal drum 14, which may, if it is so desired, likewise be driven. If it is driven, it should be driven so that the belt 11 will advance at the same rate of speed as the belt 10. I preferably, however, use the drum 14 as an idler, driving only the drum 12. This drum 14 may be supported in any suitable manner upon any suitable framework.

The longer belt 11 is not only trained over the drum 14, but is in addition trained around the lower portions of the drums 12 and 13 and over the lower leg of the endless belt 10.

The engagement of the belt 11 with the belt 10 must be a tight one so that when plastic is fed between them around the drum 12 and over the lower leg of the belt 10, sufficient pressure is applied for flattening the plastic material between the belts. As noted before, the polished surfaces on the two belts 10 and 11 face each other so that they will be in contact when they meet at the top of the drum 12. Any suitable or conventional belt tensioning mechanism may be used for maintaining the belts under proper tension. Such means has long been known in the belt conveyor art.

Located at the upper side or leg of the belt 10 is a heating chamber or oven 15 which may be heated to a high enough temperature to maintain the plastic fluid or flowable. Any suitable heating means, such as, a gas burner, heated air, or the like, may be employed for this purpose. This heating chamber or oven 15 is of such a size, as shown in Figure 1, as to envelop substantial portions of the converging belts 10 and 11 at the upper side of the belt 10. In other words, the belts are adapted to travel through this heating area. They travel in the direction from left to right, as shown in Figure 1, so that they move in a direction in which the belts tend to converge at the drum 12.

Also extending into the oven 15 is the nozzle end of an extruder 16 which may be of any conventional construction. I have in my copending patent application, Serial No. 636,874 filed December 22, 1945, now Patent No. 2,499,398, issued March 7, 1950, disclosed one form of an extruder for extruding tubes of plastic. Pieces may be suitably cut off the extruded plastic and deposited on the polished surface of the conveyor belt 10 as shown at 17.

Excellent results may be attained by using thermoplastics such as ethyl cellulose, cellulose acetate, vinyl resins, etc. It is, of course, clear that while I have in this form of the invention illustrated separated pieces of plastic 17 as being deposited on the conveyor, sheets of plastic could be substituted therefore. In any event, the deposited plastic is to be pressed into a sheet-like or flat form irrespective of the peripheral shape of the plastic being pressed.

The deposited plastic 17 is advanced in a direction toward the drum 12 where it is engaged by the inner polished surface of the belt 11 and tighty pressed between the two belts as the belts advance around the drum 12. During the pressing operation the plastic is under a heated condition so that it is in a flowable state. Thus the plastic is caused to be flattened and to be provided with highly polished surfaces or sides.

When the flattened plastic reaches the drum 13, it may be suitably cooled as by cooling the drum or cooling it where it leaves the drum. Any suitable cooling means, such as water sprays or the like, may be used for this purpose. I have designated the flattened plastic articles or sheets by the reference character 18—18.

It will be perceived that by reason of the spacing of the drum 14 from the drum 13, access may be had to the flattened plastic sheets or articles 18—18 for the purpose of stripping them off the polished outer surface of the endless belt 10.

This form of my invention may be used to advantage in manufacturing flattened plastic articles, such as doughnut rings, and the like, for use as blanks in the making of trim rings for automobiles, etc.

While I have disclosed an extruder 16 as being used for the purpose of depositing plastic on the outer polished surface of the belt 10, it is, of course, clear that the plastic articles could be deposited in other manner, such as by hand, etc.

It is believed that my novel method of forming plastic will be fully understood from the aforesaid description of an apparatus for practicing the method. While I have disclosed one form the flattening of articles, such as doughnut rings, it is, of course, clear that my invention may be employed for making an article of manufacture flattened plastic strip instead of the individual round articles.

Also if it is so desired, depending upon the type of plastic being treated, a lubricating fluid of the type used in the plastic industry may be used on the polished surfaces of the belts to facilitate subsequent stripping of the flattened plastic therefrom.

I claim as my invention:

1. In a plastic forming machine cooperable endless belts, spaced cylindrical drum means over which one of said belts is trained, another cylindrical drum offset with respect to said spaced drum means and over which a second belt is trained, said second belt also being trained around said spaced drum means and a portion of the first belt therebetween, means for driving at least one of said drum means and drum to move both belts forward in the same direction to a point where they converge into engagement with each other on one of the drums of said spaced drum means, and means defining a heating area in advance of the converging of said belts and between the belts in which plastic is delivered onto a surface of said first mentioned belt to be pressed together by the portions of the belts engaging each other around the spaced drum means.

2. In a plastic forming machine cooperable belts having highly polished surfaces, said belts being of endless character and one being of a greater length than the other, a pair of spaced drums over which the shorter belt is trained and advanced in a given direction, another drum offset from said pair of drums, said larger belt being trained over said other drum and over and around the ends of the pair of spaced drums so as to encompass the assembly and lap at least a portion of the shorter belt trained around the spaced drums, said longer belt having a leg converging toward one of the spaced pair of drums and defining a space between the two belts in which plastic may be introduced in advance of the two belts being pressed together around the common pair of spaced drums.

3. In a machine for forming thermoplastic material on the order of cellulosic or vinyl resin material into thin sheet-like form, spaced cooling and heating drums, a polished endless belt trained over said drums, said drums being rotatably mounted and motivated to effect endless travel of said belt in one direction, the run of said belt which travels toward the heated drum from the cooling drum being disposed in an upwardly facing plane, a second polished surface endless belt substantially longer than the first belt being trained about said drums and engageable with said first belt throughout the major portion of the travel of said first belt about said drums and the run of the first belt traveling from the heated drum to the cooling drum, an idler roll rotatably offset from the cooling drum and having the second belt trained thereover and holding the second belt in spaced relation to the upwardly facing run of the first belt to converge with the first belt at the heating drum and to diverge from the first belt at the cooling drum, and means between the converging portions of the first and second belts spaced rearwardly from the heating drum and forwardly from the cooling drum for depositing thermoplastic material on said upwardly facing run, whereby the material is carried by said upwardly facing run to the convergence of the belts at the heating drum to be pressed between the belts in travel about the heating drum and then carried between the substantially contiguous runs of the belts and about the cooling drum to the divergence of the belts whereafter to be exposed in flattened sheet condition for removal from the upwardly facing run of the first belt behind said plastic delivering means.

4. In a machine for forming thermoplastic material on the order of cellulosic or vinyl resin material into thin sheet-like form, spaced cooling and heating drums, a polished endless belt trained over said drums, said drums being rotatably mounted and motivated to effect endless travel of said belt in one direction, the run of said belt which travels toward the heated drum from the cooling drum being disposed in an upwardly facing plane, a second polished surface endless belt substantially longer than the first belt being trained about said drums and engageable with said first belt throughout the major portion of the travel of said first belt about said drums and the run of the first belt traveling from the heated drum to the cooling drum, an idler roll rotatably offset from the cooling drum and having the second belt trained thereover and holding the second belt in spaced relation to the upwardly facing run of the first belt to converge with the first belt at the heating drum and to diverge from the first belt at the cooling drum, means between the converging portions of the first and second belts spaced rearwardly from the heating drum and forwardly from the cooling drum for depositing thermoplastic material on said upwardly facing run, whereby the material is carried by said upwardly facing run to the convergence of the belts at the heating drum to be pressed between the belts in travel about the heating drum and then carried between the substantially contiguous runs of the belts and about the cooling drum to the divergence of the belts whereafter to be exposed in flattened sheet condition for removal from the upwardly facing run of the first belt behind said plastic delivering means, and means defining a heating chamber encompassing the converging portions of the belts and said thermoplastic delivering means, whereby to preheat the converging portions of the belts and the thermoplastic heating means and maintain the deposited plastic in a heated plastic condition before pressing to sheet form between the belts.

5. In a method of forming individual masses of thermoplastic material into individual thin sheet-like blanks, the steps which comprise preheating a pair of polished metal belts from a point where the belts are substantially separated to a point of convergence and running one of the belts with the converging surface thereof facing generally upwardly, depositing a succession of thermoplastic masses of the material upon said upwardly facing surface, driving the belts in unison toward convergence and running the belts about a common pair of spaced drums to maintain the belts close together for squeezing the masses of material flat therebetween throughout an extended travel between the belts as the belts travel over and between said rolls, and cooling and separating the belts to release the flattened plastic blanks.

GEORGE ALBERT LYON.

REFERENCES CITED

The following references are of record in the file of this patent:

UNITED STATES PATENTS

| Number | Name | Date |
|---|---|---|
| 986,162 | Gare | Mar. 7, 1911 |
| 2,069,589 | Meijling et al. | Feb. 2, 1937 |
| 2,075,735 | Loomis | Mar. 30, 1937 |
| 2,091,125 | Stewart | Aug. 24, 1937 |
| 2,200,262 | Daley et al. | May 14, 1940 |